July 12, 1960 W. H. TAYLOR 2,945,164
ELECTROLYTE AND CAPACITOR UTILIZING THE SAME
Filed Sept. 30, 1955
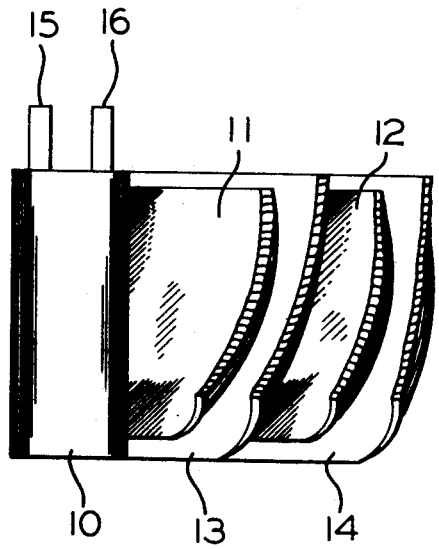
INVENTOR.
WALTER H. TAYLOR
BY
Roland A Depter
HIS ATTORNEY

United States Patent Office 2,945,164
Patented July 12, 1960

2,945,164

ELECTROLYTE AND CAPACITOR UTILIZING THE SAME

Walter H. Taylor, Williamstown, Mass., assignor to Sprague Electric Company, North Adams, Mass., a corporation of Massachusetts Filed Sept. 30, 1955, Ser. No. 537,812

2 Claims. (Cl. 317—230)

The present invention relates principally to new and improved electrolytes for electrical components such as electrolytic capacitors.

The prior art on the subject of electrolytes, specifically electrolytes for electrolytic capacitors, abounds with literary references, patents, and trade secrets of practically all manner and type. The ineffectiveness of this art is quite closely indicated by the amount of it, as well as by the fact that research on the subject of electrolytes for capacitors of the indicated variety continues with undiminished vigor throughout the electrical components industry.

The prior electrolytes employed in electrolytic capacitor systems are primarily of two broad types; the wet type and the dry variety. With both of these types of electrolytes there are serious problems relating to corrosion, venting, leakage resistance, power factor, and other similar considerations. Both varieties consist primarily of an ionized inorganic or organic compound dissolved in one or more solvents. For the present day "wet" tantalum electrolytic capacitors the preferred electrolyte is relatively concentrated aqueous sulfuric acid, while with the present day "dry" electrolytes the preferred electrolyte consists of a viscous mass comprising various borates dissolved in ethylene glycol and water. Even these electrolytes, which are probably the best of the prior art, suffer from one or more of the disadvantages indicated above, as well as the fact that they cannot be operated satisfactorily at either very low or very high temperatures.

An object of the present invention is to overcome the aforegoing and related disadvantages of the prior art. A further object is to produce a new and improved film forming electrolyte useful for electrolytic capacitors. A third object of the invention is to produce an electrolyte for electrolytic devices which can be satisfactorily operated for extended periods under conditions of electrical stress at both high and extremely low temperatures. A still further object of the invention is to produce an electrolyte which can be used in electrolytic capacitors with only a slight change in dissipation factor over a wide temperature range. These and further objects of the invention, as well as the advantages of it, will be apparent from this specification, as well as the annexed claims.

The above objects of the invention are achieved by the use of an unsubstituted simple nitrile, or mixtures of said nitriles, as solvents in electrolytes of the indicated variety. These unsubstituted simple nitriles are hydrocarbons substituted only with CN and are liquid within the range of temperatures of from about −60° C. to about 130° C. and possess dielectric constants of at least 30.

The names of many of these unsubstituted simple nitriles which can be used as solvents with the present invention are indicated in the text "Chemistry of Organic Cyanogen Compounds" by Migrdichian, published in 1947 by Reinhold Publishing Company. Among those nitriles which can be employed are the following:

| | |
|---|---|
| Malono nitrile | Phenylacetonitrile |
| Ethylene cyanide | o-Tolunitrile |
| Isocroto nitrile | m-Tolunitrile |
| Propio nitrile | Ethylcyanoacetate |
| n-Butyro nitrile | Caprinitrile |
| Isobutyronitrile | Lauronitrile |
| n-Valeronitrile | Myristonitrile |
| Isovaleronitrile | Palmitronitrile |
| n-Caprylonitrile | Stearonitrile |
| n-Oenanthronitrile | Elaidonitrile |
| n-Pelargonitrile | Suberonitrile |
| Vinylacetonitrile | n-Decanenitrile |
| Glutamonitrile | Crotonitrile |
| Pimelonitrile | n-Capronitrile |
| Cinnamonitrile | Isocapronitrile |

Specifically excluded from this invention are the hydroxy substituted hydrocarbon nitriles also known as cyanohydrins and the isonitriles. The former have an apparent instability either readily polymerizing or decomposing, while the latter readily hydrolyze. As apparent from the foregoing, the unsubstituted simple nitriles not only have a high dielectric constant and generally broad temperature range of liquidity, but are stable when utilized in capacitor applications.

As indicated above, mixtures of nitriles such as are listed in the preceding paragraph can be employed with the invention. Such mixtures are quite advantageous at times in forming solvents having lower freezing points and higher boiling points than their individual constituents. With such mixtures, nitriles which otherwise would not be suitable with the present invention, can be used.

Other co-solvents can also be used in a minor proportion, together with nitriles or mixtures of nitriles as indicated above. These co-solvents in many cases also form solutions having improved properties over the individual nitrile solvents to which they are added. Among the satisfactory co-solvents which can be used with the invention are various glycols, such as ethylene glycol, propylene glycol, etc., and water. These secondary co-solvent ingredients are preferably used in an amount equal to or less than 25% by weight of the nitriles employed. In many instances the co-solvents utilized with the invention aid in placing the electrolyte solutes in solution.

These solutes encompass a wide range of compounds which can be used in an amount equal from .1 to 20% of the weight of the solvent or solvents employed. Among those satisfactory capacitor electrolytes employed as solutes are: inorganic compounds, such as lithium chloride, boric acid, ammonium pentaborate, or other known inorganic acids, bases, and salts; or sodium citrate, potassium tartrate, sodium glucinate, sodium lactate, calcium, magnesium, or other alkali salts or organic acids, such as phthalic, salicyclic, and gallic acids. Suitable organic acids for use as electrolytes are succinic, picric, tartaric, lactic, phthalic, acetic, and glyoxalic acids. Suitable bases are amines, such as triethyl amine, triphenyl amine, and the like, and hydrazines, such as phenyl hydrazine. Organic salts of strongly ionizing well-known acids, such as are listed above, are also useful as solutes. Among those salts are the ammonium picrates, triethanol ammonium picrate, and the like. Other related ionizable organic compounds, such as chloracetamide can also be used with the invention as electrolytes.

A preferred range within the broad limits indicated above for any solute is between about ½ to 12% by weight of the solvent. Care must always be taken in choosing a solvent-solute system that the specific solute employed is sufficiently soluble in the solvent so as to achieve the desired concentration.

Reference is made to the appended drawing in which 10 represents a capacitor section, partially unwound. Anode 11 of the capacitor 10 is of a so-called valve metal (e.g. aluminum, tantalum, zirconium, etc.) having on its surface an oxide layer which functions as the dielectric. Cathode 12 is of a valve metal, or an inert metal, such as silver or platinum, as desired. Porous spacers 13 and 14 are fully impregnated with the nitrile-containing electrolyte as taught in the foregoing. Tabs 15 and 16 are connected to the two electrode foils 11 and 12 as terminals.

For the purpose of illustrating the present invention, the following examples are given. It is to be understood that these examples are not limiting in any manner, and the inventive concept is broader than those set forth.

Electrolytic capacitors as set forth in the drawing were prepared utilizing a 3-mil thick aluminum foil having an area of 5 square inches which had been formed to 600 v. in boric acid as an anode, and utilizing an aluminum chloride of the same size. These two electrodes were separated from one another by a 5-mil thick fiber glass spacer. The units were then impregnated with electrolytes of the invention as follows:

(1) A 5 percent solution of sodium acetate dissolved in N-Pelargo nitrile was used as an electrolyte. Conventional vacuum techniques were used at a temperature of 50° C.

(2) An electrolyte consisting of 2 percent triethanol amine dissolved in o-tolunitrile as impregnated in the capacitor indicated above using conventional vacuum techniques at 50° C.

(3) A solution of 4 grams of chloracetamide dissolved in 100 g. ethyl cyanoacetate was used in the condenser above indicated following impregnation in accordance with conventional vacuum techniques at 50° C.

(4) 0.3 g. of triethanol ammonium picrate dissolved in a solvent consisting of 4.35 g. of caprylonitrile and 5.80 g. of tributyl phosphate was employed as an electrolyte in the above condenser utilizing conventional vacuum techniques at room temperature.

(5) 0.5% solution of lithium picrate in n-caprylonitrile was employed in a capacitor having a tantalum anode formed at 200 v.d.c. and an aluminum cathode. The anode had a surface area of 12 square inches and was separated from a cathode of the same surface area by a 6 mil fiber glass spacer.

The use of nitriles or mixtures thereof having very low freezing points and high boiling points will, as is readily realized from the above, make possible the fabrication of capacitors having wide operating ranges. The invention herein described primarily relates to those capacitors having an operating range of from about −60° C. to about 130° C. The nitriles are particularly advantageous for use at low temperatures because they are noted for their low viscosity up to about the temperature at which they freeze. This keeps the dissipation factor quite low in low temperature electrolytic capacitors. With proper solutes, as indicated above, the nitrile solvent systems, herein indicated, form electrolytes which are essentially non-corrosive, which do not gas at elevated temperatures, and which are readily impregnated in capacitance units.

As many apparently widely different embodiments of my invention may be made without departing from the spirit and scope hereof, it is to be understood that my invention is not limited to the specific embodiments hereof except as defined in the appended claims.

This is a continuation-in-part of my copending application, Serial No. 322,830, filed November 26, 1952, and later abandoned.

I claim:

1. In an electrolytic capacitor, a convolutely wound anode foil of formed valve metal and a porous spacer impregnated with a solution of an ionizable compound at a concentration of between 0.1 and 20% by weight in a solvent consisting essentially of a stable liquid unsubstituted simple nitrile.

2. The capacitor of claim 1 in which the solute is a salt of picric acid.

References Cited in the file of this patent

UNITED STATES PATENTS

| | | |
|---|---|---|
| 2,152,465 | Clark | Mar. 28, 1939 |
| 2,759,132 | Ross | Aug. 14, 1956 |
| 2,786,165 | Ross | Mar. 19, 1957 |

OTHER REFERENCES

Philip: "A Comparative Study of the Nitriles as Solvents," in Chemistry at the Centenary (1931), Meeting Brit. Assoc. Advancement Sci. (1932), pp. 54–57.

Trans. Faraday Society, vol. 49, 1953, pp. 314–323, 791–795.